US012803460B2

(12) United States Patent
Drofenik et al.

(10) Patent No.: US 12,803,460 B2
(45) Date of Patent: Nov. 17, 2026

(54) CONVERTER AND METHOD OF CONVERTING A MEDIUM VOLTAGE AC POWER INTO A LOW VOLTAGE DC POWER

(71) Applicants: ABB E-Mobility B.V., Delft (NL); ABB Schweiz AG, Baden (CH)

(72) Inventors: Uwe Drofenik, Zürich (CH); Francisco Canales, Baden-Dättwil (CH); Daniel Christen, Uster (CH)

(73) Assignee: ABB E-Mobility B.V., Delft (NL)

( * ) Notice: Subject to any disclaimer, the term of this patent is extended or adjusted under 35 U.S.C. 154(b) by 232 days.

(21) Appl. No.: 18/652,978

(22) Filed: May 2, 2024

(65) Prior Publication Data

US 2024/0372482 A1 Nov. 7, 2024

(30) Foreign Application Priority Data

May 4, 2023 (EP) .................................... 23171631

(51) Int. Cl.
*H02M 7/21* (2006.01)
*H02M 1/00* (2006.01)
*H02M 7/219* (2006.01)

(52) U.S. Cl.
CPC ........... *H02M 7/219* (2013.01); *H02M 1/007* (2021.05)

(58) Field of Classification Search
CPC .............................. H02M 7/219; H02M 1/007
See application file for complete search history.

(56) References Cited

U.S. PATENT DOCUMENTS

2012/0294050 A1 11/2012 Hashimoto et al.
2023/0048596 A1 * 2/2023 Drofenik ........... H02M 3/33584

FOREIGN PATENT DOCUMENTS

| | | | |
|---|---|---|---|
| DE | 3826524 | A | 3/1989 |
| EP | 4135184 | A1 | 2/2023 |
| EP | 4135187 | A1 | 2/2023 |
| JP | 05205952 | A | 8/1993 |

OTHER PUBLICATIONS

European Extended Search Report, Application No. 23171631.7, dated Oct. 13, 2023, 7 pps.

* cited by examiner

*Primary Examiner* — Rafael O De Leon Domenech
(74) *Attorney, Agent, or Firm* — McCarter & English, LLP; Michael M. Gnibus

(57) ABSTRACT

A converter for converting a medium voltage AC power into a low voltage DC power is provided. The converter includes a line interphase transformer having at least one core, a plurality of coils provided on the at least one core and configured for receiving the medium voltage AC power, and at least one auxiliary winding provided on the at least one core and inductively coupled to the medium voltage AC power by the core. The line interphase transformer is configured for generating a plurality of phase-shifted AC powers from the medium voltage AC power. The converter further includes a rectifier configured for generating a medium voltage DC power from the plurality of phase-shifted AC powers, and a DC/DC converter stage including a switching stage and a converter transformer. The DC/DC converter stage is configured for generating a low voltage DC power from the medium voltage DC power.

19 Claims, 3 Drawing Sheets

CONVERTER AND METHOD OF CONVERTING A MEDIUM VOLTAGE AC POWER INTO A LOW VOLTAGE DC POWER

CROSS REFERENCE TO RELATED APPLICATIONS

This patent application claims the benefit and priority of European Patent Application No. 23171631.7 filed on May 4, 2023, the disclosure of which is incorporated by reference herein in its entirety as part of the present application.

BACKGROUND

Aspects of the disclosure relate to the conversion of an AC power, particularly a medium voltage AC power, into a low voltage DC power. Aspects of the disclosure particularly relate to a converter including a line interphase transformer. Aspects of the disclosure particularly relate to the generation of an auxiliary power, which may be utilized by stages of the converter.

AC/DC converters, which are connected to the medium voltage grid in the Megawatt power range, are a key component to connect energy producers (solar, wind), energy consumers (electric vehicle and battery charging, datacenter, hydrogen production) and storage (batteries, fuel cell, hydrogen) to the grid. In order to reduce footprint and cost of such converters, so-called solid state transformers (SST) have been proposed.

SSTs often include a medium voltage DC link, carrying a DC voltage generated by rectifying an AC medium voltage received e.g., from a medium voltage grid. A line interphase transformer (LIT) may be provided to provide a multi-pulse AC voltage to a rectifier and/or help fulfil grid harmonic standards.

SSTs may include actively switched components, controllers, and/or auxiliary systems such as cooling systems, which may require an auxiliary power, such as a low voltage DC power during operation of the SST. Since the LIT generally does not provide galvanic insulation from the medium voltage grid, auxiliary power sources often require means for insulating the auxiliary power source from the medium voltage. For example, in state-of-the-art solutions, this auxiliary power is often provided from the medium voltage side via a 50 Hz transformer, which may be comparatively large and expensive due to the low operating frequency and the medium voltage insulation requirements.

Thus, there is a need for an improved power source suitable for providing an auxiliary power in a converter.

BRIEF DESCRIPTION

In view of the above, the disclosure as set out in the appended set of claims is provided.

According to an aspect, a converter for converting a medium voltage AC power into a low voltage DC power is described. The converter includes a line interphase transformer having at least one core, a plurality of coils provided on the at least one core and configured for receiving the medium voltage AC power, and at least one auxiliary winding provided on the at least one core and inductively coupled to the medium voltage AC power by the core. The line interphase transformer is configured for generating a plurality of phase-shifted AC powers from the medium voltage AC power. The converter further includes a rectifier configured for generating a medium voltage DC power from the plurality of phase-shifted AC powers, and a DC/DC converter stage including a switching stage and a converter transformer. The DC/DC converter stage is configured for generating a low voltage DC power from the medium voltage DC power. The converter transformer galvanically insulates the low voltage DC power from the medium voltage AC power. The DC/DC converter stage is powered by the at least one auxiliary winding.

According to an aspect, a method of converting a medium voltage AC power into a low voltage DC power is described. The method includes feeding the medium voltage AC power to a line interphase transformer to generate a plurality of phase-shifted AC powers, rectifying the plurality of phase-shifted AC powers to generate a medium voltage DC power, and converting the medium voltage DC power into a low voltage DC power in a DC/DC converter stage. The low voltage DC power is galvanically insulated from the medium voltage AC power. The method further includes powering the DC/DC converter stage with power provided by at least one auxiliary winding. The auxiliary winding is included in the line interphase transformer and inductively coupled to the medium voltage AC power through a core of the line interphase transformer.

According to an aspect, a low voltage is described. A low voltage may be a voltage above 200 Volt (V), such as a voltage between 200 V-1 kV. According to an aspect, a medium voltage is described. A medium voltage may be voltage of above 1 kV, such as a voltage between 1 kV-52 kV, particularly between 1 kV-30 kV. For example, a medium voltage may be a voltage received, and optionally rectified, from a medium voltage grid, such as a 10 kV grid, a 15 kV grid, a 20 kV grid, a 25 kV grid, a 30 kV grid, or even a 50 kV grid. The medium voltage grid may be e.g., a 50 Hz grid or a 60 Hz grid.

According to an aspect, a converter is described. The converter is configured for converting a medium voltage AC power into a low voltage DC power. The low voltage DC power may be particularly useful for low voltage DC applications, such as, but not limited to, powering devices, electric vehicle charging, electrolytic processes such as hydrogen generation, and/or any of the uses described in the background section of this disclosure. The converter may be configured for providing a low voltage DC power having at least 500 Kilowatt (KW), at least 1 MW, at least 2 MW, at least 3 MW, at least 5 MW, or even at least 10 MW. The converter includes a line interphase transformer, a rectifier, and a DC/DC converter stage.

According to an aspect, the converter includes a LIT, an auxiliary winding provided on a core of the LIT, and one or more stages powered by an auxiliary power generated the auxiliary winding. Accordingly, further stages of the converter may be optional, and/or the converter may be configured for generating a power other than a low voltage DC power. For example, the converter may be configured for generating a low voltage AC power, e.g., instead of a DC/DC converter stage, a DC/AC converter stage may be provided. For example, the converter may be configured for generating a medium voltage DC power corresponding to the rectified medium voltage AC power, e.g., the DC/DC converter stage may be optional.

According to an aspect, a DC/DC converter stage is described. The DC/DC converter stage includes a switching stage and a converter transformer. A medium frequency AC power may be generated by a switching stage, such as an inverter. The medium frequency AC power may be generated, by the switching stage, from a medium voltage DC power, such as a medium voltage DC power generated and provided to a medium voltage DC link by a rectifier.

According to an aspect, a converter transformer is described. The converter transformer may be a medium frequency transformer (MFT). The medium frequency transformer may be a transformer configured for transforming a medium frequency AC power. The medium frequency AC power may have a medium frequency. A medium frequency, according to embodiments described herein, may be understood as a frequency at or above 400 Hertz (Hz), at or above 600 Hz, at or above 800 Hz, at or above 1 kHz, at or above 2 kHz, at or above 5 kHz, at or above 10 kHz, at or above 20 kHz, at or above 50 kHz, or even at or above 100 kHz.

According to an aspect, a line interphase transformer (LIT) is described. The LIT may be an interphase transformer configured for generating a plurality of phase-shifted AC outputs from an AC input. The LIT may be a reactor. The LIT may be an autotransformer. Line interphase transformers are described in document DE3826524A1, which is incorporated herein in its entirety, and/or at least to the extent of embodiments describing a line interphase transformer, such as the line interphase transformer described with reference to FIG. 10 of the document. The LIT includes at least one core and a plurality of coils and/or windings provided on the at least one core. The LIT is configured for receiving a medium voltage AC power, e.g., from a medium voltage AC power grid.

According to an aspect, the at least one core may be galvanically insulated from the plurality of coils provided on the at least one core. According to an aspect, the core may be grounded.

According to an aspect, the LIT may be configured for splitting an input current of the AC power into two or more currents which are phase-shifted with respect to the input current. For example, the medium voltage AC power may include three phases, which are received from a three-phase medium voltage power system, such as a medium voltage grid, and the LIT is configured for generating a plurality of phase-shifted three-phase AC powers and/or power systems from the medium voltage AC power.

According to an aspect, the LIT is connectable to a medium voltage AC power having n phases, and the plurality of phase-shifted AC powers is connected to the rectifier, the rectifier being a multi-pulse rectifier configured for rectifying from 2 n to 12 n pulses, particularly having from 4 n to 12 n pulses.

According to an aspect, the LIT is connectable to a medium voltage AC power having n phases, and the plurality of phase-shifted AC powers each include n phases, each phase of the phase-shifted AC powers being shifted by an essentially same phase-shift.

According to an aspect, the LIT is connectable to a medium voltage AC power having three phases, and wherein the plurality of phase-shifted AC powers is connected to the rectifier, the rectifier being a multi-pulse rectifier configured for rectifying 12, 18, 24, or 48 pulses.

According to an aspect, a 3-phase medium voltage AC grid is connected and/or connectable to the LIT which splits the 3-phase AC power system into multiple (n) 3-phase AC systems, which are phase-shifted by 2 $\pi$/n, and result in n-pulse DC link voltage at the output of the rectifier, such as a diode bridge output.

According to an aspect, the LIT may generate three three-phase AC powers from the medium voltage AC power, which may be rectified in an 18-pulse rectifier. Likewise, the LIT may be configured for providing a plurality of AC powers to a 12-pulse rectifier, a 24-pulse rectifier, 36-pulse rectifier, or even a 48-pulse rectifier.

Beneficially, the LIT may reduce harmonic noise and/or allow the generation of a low-ripple DC power by the rectifier.

According to an aspect, the converter transformer galvanically insulates the low voltage DC power from the medium voltage AC power. In particular, the converter transformer may insulate the medium frequency AC power provided to the converter transformer from the medium frequency AC output power of the converter transformer. Accordingly, galvanic insulation of the converter between the low voltage DC power and the medium voltage AC power may be provided by only the converter transformer. Accordingly, the converter may be devoid of galvanic insulation between the medium frequency AC power and the LIT, the LIT and the rectifier, the rectifier and the switching stage, and/or the switching stage and/or a first coil of the converter transformer. Accordingly, the LIT, the rectifier, and the portion of the DC/DC converter including at least the switching stage, may be considered a medium voltage side of the converter. According to an aspect, at least one of the rectifier and the DC/DC converter is connected without galvanic insulation therebetween to an input terminal of the line interphase transformer, the input terminal being configured for receiving the medium voltage AC power.

According to an aspect, an auxiliary winding is described. The auxiliary winding is provided on the at least one core of the LIT. The auxiliary winding is inductively coupled to the medium voltage AC power by the core. The auxiliary winding may be galvanically insulated from the medium voltage AC power and/or other components of the converter, such as the LIT, the rectifier, and/or the DC/DC converter. Beneficially, since the LIT core may be grounded, the auxiliary winding may be considered "on ground" and may thus not require additional medium voltage insulation. Still pertaining to this aspect, additionally, or alternatively, the auxiliary winding may be potted, e.g., the auxiliary winding may be provided as a cast coil.

According to an aspect, a plurality of auxiliary windings may be provided. For example, in case the LIT includes a plurality of cores, an auxiliary winding may be provided on some or even all of the cores. Multiple auxiliary windings, such as two or more auxiliary windings, may be provided on a core. Accordingly, a plurality of auxiliary powers may be generated by the plurality of auxiliary windings.

According to an aspect, a power generated by the auxiliary winding may be utilized for powering stages, systems, subsystems, and/or auxiliary systems of the converter. In particular, the DC/DC converter stage may be powered by the auxiliary winding and/or the plurality of auxiliary windings. For example, the winding may power a controller of the switching stage configured for controlling and/or a driver for driving electronic switches of an inverter. In particular, the winding may power an actively switched rectifier, such as a rectifier suitable for bi-directional power transfer. Likewise, further components of the converter, such as sensors and/or components for monitoring the converter, and/or thermal management systems, such as a cooling, ventilation and/or temperature monitoring system, may be powered by an auxiliary winding, and may even be powered individually by a dedicated auxiliary winding.

According to an aspect, the auxiliary winding provides an auxiliary AC power. The voltage of the auxiliary AC power may be defined by the number of turns of the auxiliary winding. According to an aspect, the auxiliary AC power may be stepped down with respect to the medium voltage AC power, such as to a low voltage level, such as to a level of between 10 Volt (V) to 500 V, such as between 50 V to 250 V, such as to a level of about 100 V or below 100V, such as a level of about 50 V or below 50 V. Beneficially, the number of turns of the auxiliary winding may be low compared to the coils receiving the medium voltage AC power. For example, an auxiliary winding may have less than 20 turns, less than 15 turns, less than 10 turns, or even less than 6 turns. Beneficially, the auxiliary winding may, particularly due to the comparatively low number of turns, be small with respect to other coils provided on the core of the LIT. Accordingly, the auxiliary winding may be easily integrated into existing LIT designs.

According to an aspect, an auxiliary DC power may be generated from the auxiliary AC power. For example, an AC/DC converter may be provided to generate the auxiliary DC power from the auxiliary AC power. In particular, in embodiments having a plurality of auxiliary windings, an AC/DC converter may be provided for each auxiliary AC power. Accordingly, a plurality of independent and/or galvanically insulated auxiliary DC powers may be obtained. According to an aspect, the AC/DC converter may include a rectifier circuit, a switched-mode power supply unit and/or any other known type of AC/DC converter circuit known at the time of filing this disclosure, e.g., for providing 5 $V_{DC}$, 10 $V_{DC}$, 12 $V_{DC}$, 24 $V_{DC}$, 48 $V_{DC}$ powers, or the like.

According to an aspect, the converter, particularly the switching stage and/or the rectifier, may include a plurality of semiconductor devices. In some embodiments described herein, the semiconductor devices may be depicted and/or described as transistors and/or diodes, particularly semiconductor diodes such as silicon diodes, however, different types of semiconductor devices, such as switchable semiconductor devices may be provided. For example, the converter, and/or even the rectifier, may include actively switchable semiconductor devices, such as transistors and/or thyristors, such as a metal-oxide semiconductor field-effect transistor (MOSFET), an insulated-gate bipolar transistor (IGBT), high-electron-mobility transistor (HEMT), or an integrated gate-commutated thyristor (IGCT).

According to an aspect, the auxiliary power generate by the auxiliary winding(s) in a converter is lower than the rated power of the low voltage DC power. In particular, the auxiliary power may be less than 5%, less than 2%, less than 1%, less than 0.5%, less than 0.2% or even less than 0.1% of the rated power of the low voltage DC power. For example, a converter configured for providing a 3 MW low voltage DC power from a 15 kV grid may include a plurality of auxiliary windings configured for providing, each or in combination, an auxiliary power of about 1 kW. Beneficially, the effects of drawing an auxiliary power from the LIT core may be negligible. In particular, core saturation effects and an effect on grid current harmonics may be limited, or even unnoticeable.

Further advantages, features, aspects, and details that can be combined with embodiments described herein are evident from the dependent claims, the description, and the drawings.

BRIEF DESCRIPTION OF THE DRAWINGS

The details will be described in the following with reference to the figures, wherein.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment applies to a corresponding part or aspect in another embodiment as well.

Figure 1:
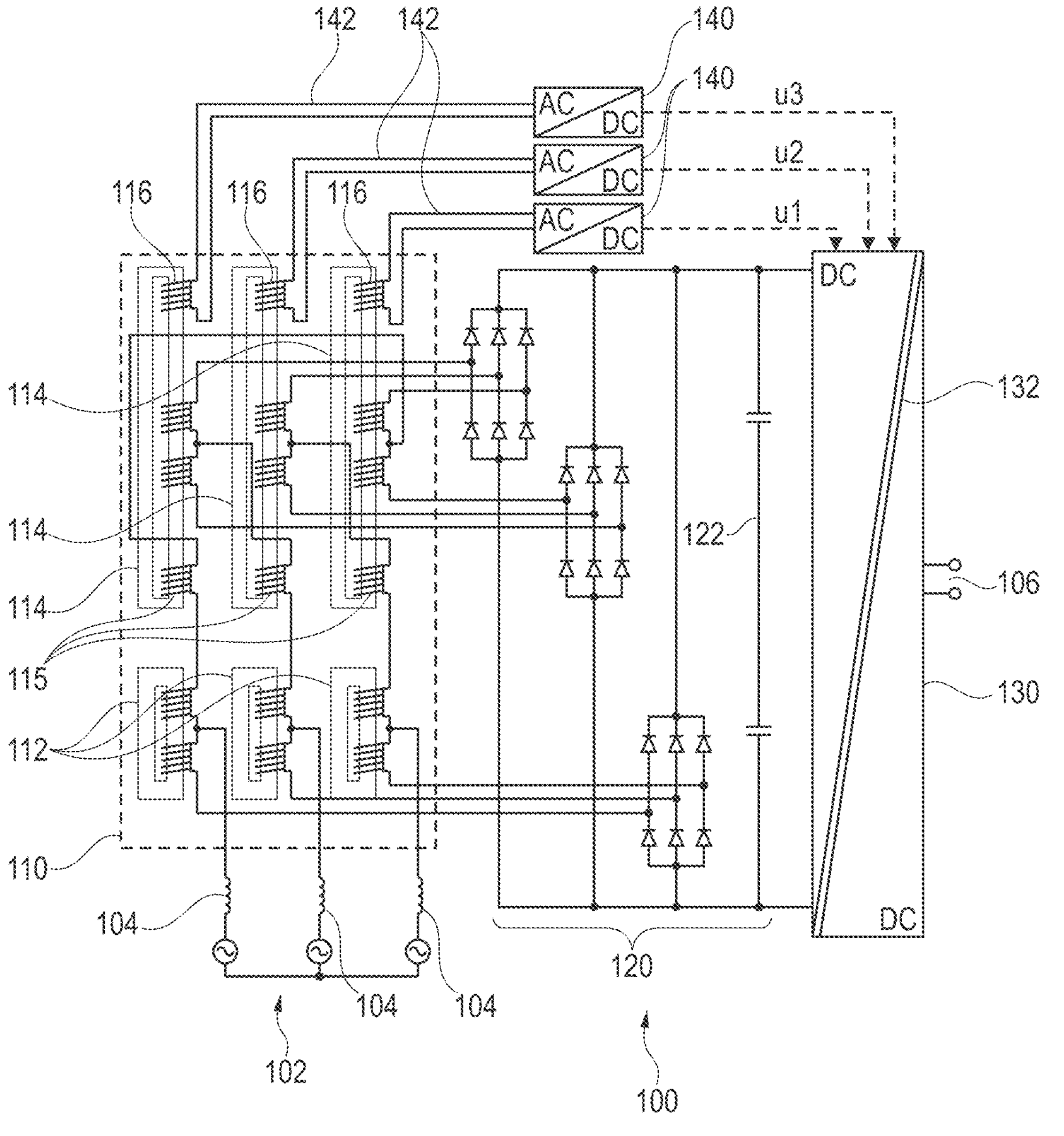
FIG. 1 is a schematic view of a converter according to a first embodiment.

Referring now to FIG. 1, a converter 100 as schematically shown in the figure is described. A three-phase medium voltage AC power is provided to a line interphase transformer (LIT) 110 from the AC power source 102 via the inductors 104.

Each phase is connected to the center of a first set of coils provided in a current-divider coil circuit that split the phases once. The current-divider coil circuit includes a first plurality of cores 112. The lower ends of the first plurality of coils are connected to a first plurality of diodes forming a diode bridge in a rectifier 120. The upper ends of the first set of coils are connected to the center of a second plurality of coils of a balance-coil circuit via inductors 115 provided on a second plurality of cores 114. The ends of these second plurality of coils are each connected to a second and third plurality of diodes forming diode bridges in the rectifier 120. The output signals of the first, second, and third plurality of coils are phase-shifted with respect to each other. The phase-shift may be controllable e.g., by choosing a turn number ratio of the inductors 115 and the second plurality of coils.

All three bridge arrangements of the rectifier stage are connected in parallel to the medium voltage DC intermediate circuit, particularly a DC link, having DC link capacitors 122. The inductors 115 provided on the balance-coil circuit are magnetically coupled to the coils of one of the neighboring AC phase branches. Since the signals are split twice, i.e., n=2, n+1 coil ends are connected to the rectifier 120, and therefore 18 diodes are provided, and 18 pulses are obtained.

According to some embodiments, the inductors 104 may be optional. According to some embodiments, the inductors 104 may be provided on the first plurality of cores, e.g., similar to the inductors 115.

The converter 100 includes a DC/DC converter stage 130 configured for converting the medium voltage provided at the DC intermediate circuit into a low voltage DC power at the outputs 106. As indicated in FIG. 1, galvanic insulation 132 is provided by the DC/DC converter stage. In particular, the DC/DC converter stage may include a converter transformer providing the galvanic insulation.

Auxiliary windings 116 are provided on the cores 114. Accordingly, the LIT 110 may operate, with respect to the auxiliary windings 116, as a transformer. In particular, a magnetic flux within the cores 114 caused by a voltage on the inductors 115 and/or the second plurality of coils may induce an auxiliary power within the auxiliary windings 116.

A current may be present when the converter is operating, e.g., generating a low voltage DC power at the outputs 106.

In the embodiment shown in FIG. 1, an auxiliary winding 116 is provided on each of the second plurality of cores 114. Additionally, or alternatively, in some embodiments, the auxiliary windings 116 may be provided on the first plurality of cores 112. As shown in FIG. 1, an auxiliary winding may be provided on a core 114 for each phase. Alternatively, according to embodiments, only some or even only one of the cores may have an auxiliary winding provided thereon. Likewise, one core 114 may include more than one auxiliary winding, such as two, three, or even more than three auxiliary windings.

As shown in FIG. 1, each auxiliary winding generates an auxiliary AC power in the conductors 142. The auxiliary powers are individually rectified in the AC/DC converters 140 to generate the independent auxiliary DC powers u1, u2, u3. The auxiliary DC powers are provided to the DC/DC converter stage 130 for powering the DC/DC converter stage 130.

Figure 2:
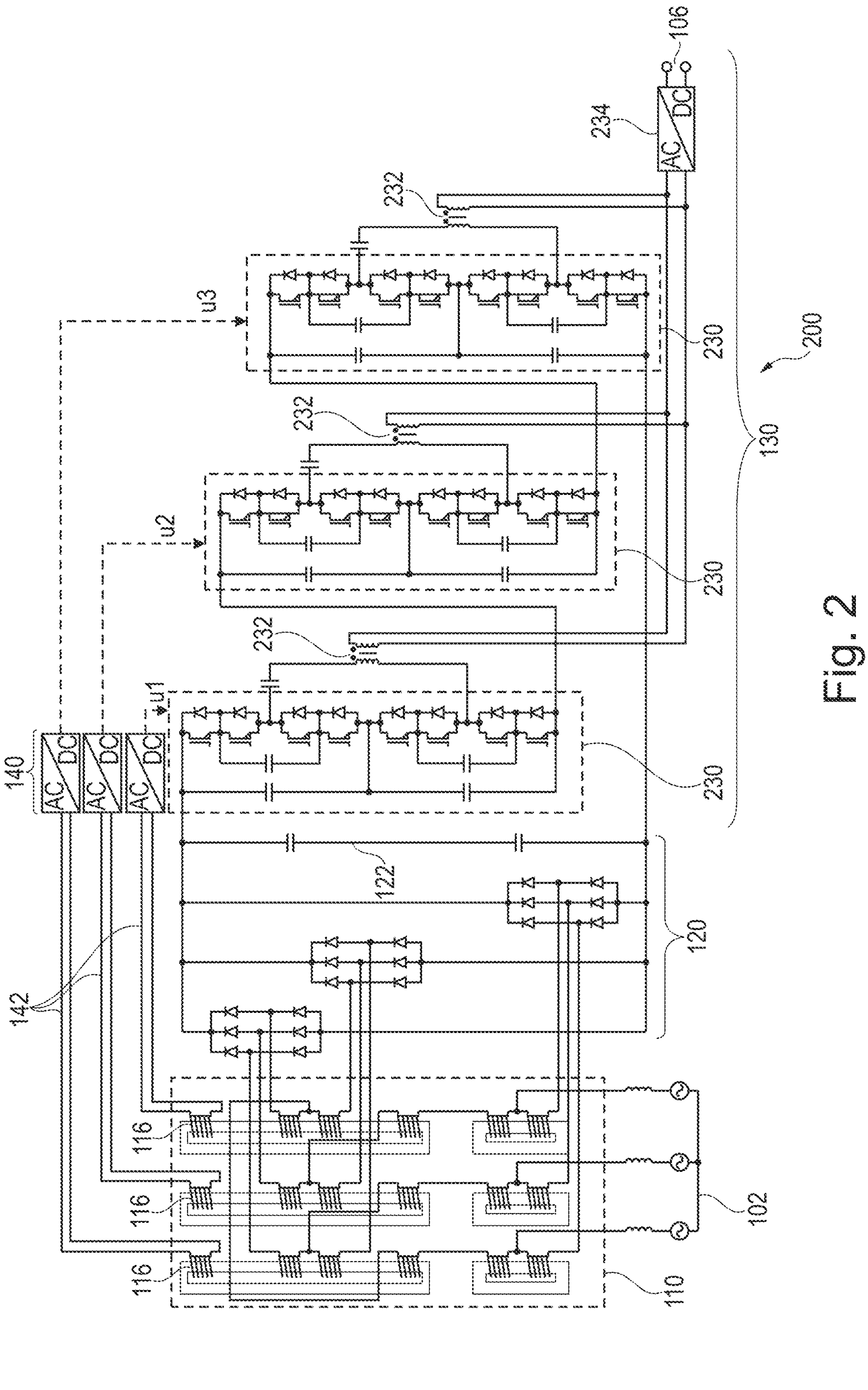
FIG. 2 is a schematic view of a converter according to a second embodiment.

Referring now to FIG. 2, a converter 200 according to an embodiment is described. Only the differences with respect to the converter 100 shown in FIG. 1 are described. Some aspects described with reference to the converter 200 may apply to the converter 100.

In the converter 200, the DC/DC converter includes three switching stages 230 connected in series to the medium voltage DC intermediate circuit. Each of the switching stages 230 is configured for generating a medium frequency AC output, and for providing the medium frequency AC output to a converter transformer, particularly a medium frequency transformer 232.

The number of switching stages 230 is not limited to three, and may be chosen according to the desired properties of the converter 200, e.g., the DC link voltage, the power rating of the converter, or other design considerations. Accordingly, the converter 200 may include one, two, three, four, five, six, or even more than six switching stages. Additional switching stages connected in series may allow the converter to operate at a higher DC link voltage. Additional switching stages connected in parallel may allow the converter 200 to operate at a higher current and/or power.

As shown in FIG. 2, each medium frequency transformer has an output side that is connected in parallel to the AC/DC converter 234. The AC/DC converter 234 may be a rectifier. The AC/DC converter 234 may convert a medium frequency low voltage AC power received from the medium frequency transformers 232 into a low voltage DC power at the outputs 106.

As shown in FIG. 2, each medium frequency transformer galvanically insulates the switching stage 230 from the AC/DC converter 234. Accordingly, the medium frequency transformer galvanically insulates the low voltage DC power from the medium frequency AC output, the medium voltage DC power, and/or the medium voltage AC power.

As shown in FIG. 2, the switching stages 230 include a plurality of semiconductor switches, such as MOSFETs, connected in series. A plurality of flying capacitors is provided, e.g., for defining partial voltages between the semiconductor switches. According to embodiments, each of the switching stages 230, and/or the plurality of switching stages 230, may be a multilevel flying capacitor inverter.

The converter 200 may include one or more controllers (not shown) for controlling the DC/DC converter stage 130, and particularly the switching stages 230. The controller may be connected to inputs of the semiconductor switches, and/or be configured for driving the semiconductor switches, e.g., according to known methods of operating a switching stage 230. The controller may be connected to one or more sensors, such as voltage, current, and/or power sensors. The controller may be configured for operating the plurality of semiconductor switches to generate the medium frequency AC output, particularly so that the medium frequency low voltage AC power of each medium frequency transformer is synchronized, to balance and/or charge the flying capacitors, and/or to monitor an operation of the DC/DC converter stage 130.

According to embodiments, as shown in FIG. 2, the DC/DC converter stage 130 includes a plurality of galvanically insulated DC/DC converter stages. Galvanically insulated may particularly be understood as the medium frequency AC output of the medium frequency transformer 232, and/or the auxiliary power for powering the DC/DC converter stage 130, being galvanically insulated from the medium voltage AC power and/or the medium voltage side of the converter 200. Furthermore, according to some embodiments, the converter 200 may be configured for generating a plurality of low voltage DC powers, and the plurality of low voltage DC powers may be galvanically insulated with respect to one another, e.g., by providing separate AC/DC converters 234 for each medium frequency AC output.

As shown in FIG. 2, according to embodiments, each of the DC/DC converter stages, particularly each of the switching stages 230, is separately powered by one auxiliary winding, e.g., by the auxiliary DC powers u1, u2, u3 generated from a power received from the auxiliary windings 116. In particular, the auxiliary DC powers u1, u2, u3 may power one or more controllers, such as three individual controllers, and/or three driver circuits connected to a common controller of the converter 200.

Figure 3:
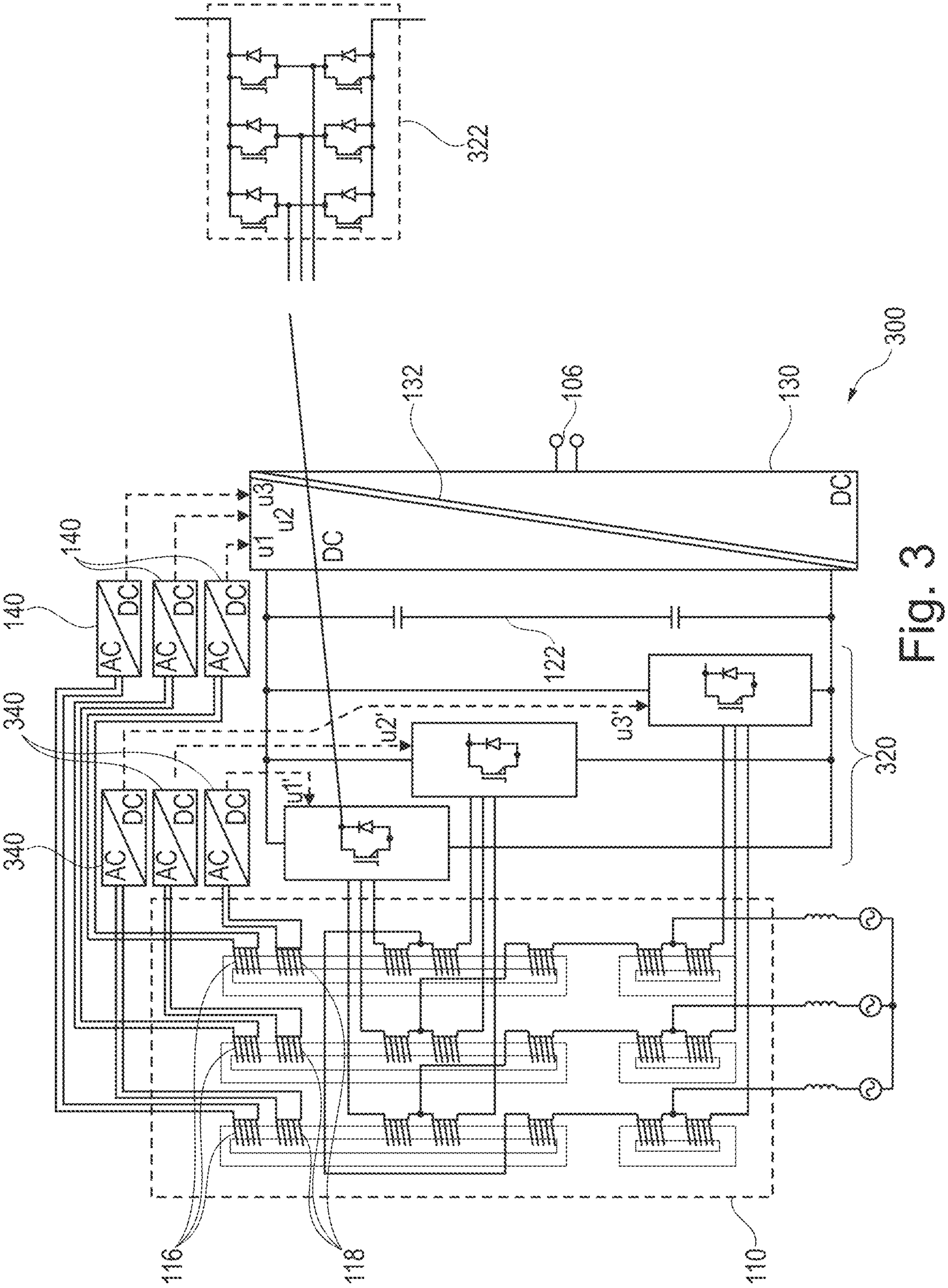
FIG. 3 is a schematic view of a converter according to a third embodiment.

Referring now to FIG. 3, a converter 300 according to an embodiment is described. The converter 300 differs from the converter 100 and/or the converter 200 in that the rectifier 320 is an actively switched and/or switchable rectifier. In particular, instead of diode bridge rectifiers 120, modules 322 including semiconductor switches arranged in a bridge-type configuration are provided. The rectifier 320 may operate, e.g., due to internal diodes included e.g., in MOSFETs, as a passive diode-type rectifier. Furthermore, the rectifier 320 may operate and/or be controllable to operate as a bi-directional rectifier, particularly for bi-directional power transfer. In some embodiments, the rectifier 320 may be operable as an inverter and/or converter.

The converter 300 may include one or more controllers (not shown) for controlling the rectifier 320 as a converter, and particularly the semiconductor switches of the modules 322. The controller may be connected to inputs of the semiconductor switches, and/or be configured for driving the semiconductor switches, e.g., according to known methods of operating a bi-directional rectifier 320 as a converter. The controller may be connected to one or more sensors, such as voltage, current and/or power sensors. The controller may be configured for operating the plurality of semiconductor switches to generate a medium voltage AC power from a medium voltage DC power provided at the medium voltage DC intermediate circuit, e.g., by the DC/DC converter stage 130.

As shown in FIG. 3, according to embodiments, each of the modules 322 is separately powered by one auxiliary winding, e.g., by the auxiliary DC powers u1', u2', u3' generated from a power received from the auxiliary windings 118. In particular, the auxiliary DC powers u1', u2', u3' may power one or more controllers, such as three individual controllers, and/or three driver circuits connected to a common controller of the modules 322.

As shown in FIG. 3, the LIT 110 of the converter 300 includes six auxiliary windings, three auxiliary windings 116 each being provided on one of three cores of the LIT 110, and three auxiliary windings 118 each being provided on one of three cores of the LIT 110. Accordingly, each core of the balance-coil circuit of the LIT may include two auxiliary windings 116, 118.

According to embodiments, a method of converting a medium voltage AC power into a low voltage DC power is described. The method may include operating a converter according to embodiments described herein, such as the converter 100, 200, 300, as described with reference to FIG. 1, FIG. 2, and/or FIG. 3. Accordingly, the method may include the use of a converter according to embodiments described herein. According to embodiments, a converter according to embodiments may be configured for carrying out one or more of the operations and/or actions of the method.

The method includes feeding a medium voltage AC power to a line interphase transformer (LIT) to generate a plurality of phase-shifted AC powers. For example, the LIT may be configured for generating three phase-shifted three-phase systems from a single medium voltage three-phase system.

The method includes rectifying the plurality of phase-shifted AC powers to generate a medium voltage DC power. In particular, the three three-phase systems may be rectified in an 18 pulse rectifier.

The method includes converting the medium voltage DC power into a low voltage DC power in a DC/DC converter stage. The DC/DC converter stage may include an inverter, a converter transformer, and/or a rectifier.

The low voltage DC power is galvanically insulated from the medium voltage AC power. In particular, the method may include providing a converter transformer in the DC/DC converter, the converter transformer providing the galvanic insulation.

The method includes powering the DC/DC converter stage with power provided by at least one auxiliary winding. The method may further include powering further components of the converter, such as sensors and/or components for monitoring the converter, and/or thermal management systems, such as a cooling, ventilation and/or temperature monitoring system, by the at least one auxiliary winding. The method may further include powering a bi-directional rectifier of the converter by the at least one auxiliary winding.

The method may include providing separate auxiliary windings for powering different components of the converter. The separate auxiliary windings may generate auxiliary powers, such as auxiliary AC powers. The auxiliary powers may be galvanically insulated with respect to one another. The auxiliary powers may differ according to the component intended to be powered by the auxiliary power, e.g., have a defined voltage and/or a defined power rating.

In some embodiments, the method may include rectifying an auxiliary AC power to generate an auxiliary DC power. In some embodiments, the method may include converting, transforming, and/or regulating the auxiliary power, e.g., to generate a regulated auxiliary DC power suitable for powering a controller for controlling a component, such a switching stage or an actively switched rectifier, of the converter.

The auxiliary winding is included in the line interphase transformer, and inductively coupled to the medium voltage AC power through a core of the line interphase transformer. Accordingly, the method may include providing the auxiliary winding on a core of the line interphase transformer. Providing the auxiliary winding may particularly include insulating the auxiliary winding, e.g., from coils and/or inductors provided on a core of the LIT. In particular, providing the auxiliary winding may include potting the auxiliary winding, and/or providing the auxiliary winding as a cast coil.

Beneficially, the systems and methods provided offer a safe, robust, reliable, and low-cost solution for powering auxiliary systems of a converter. In particular, no additional transformer and/or no medium-voltage insulation is required for obtaining an auxiliary power, which may reduce cost and size of the converter. Accordingly, a converter described herein may be particularly suitable for providing a low-voltage DC power in the kW to MW range, which may be particularly suitable for the charging of electric vehicles. Beneficially, a plurality of auxiliary windings may be provided, which may be adapted according to the power requirements of the sub-system to be powered by the power generated from the auxiliary winding. Accordingly, the provided system offers a flexible solution to supply any number of galvanically insulated medium voltage cells, such as the switching stages described with reference to FIG. 2, with an insulated auxiliary power.

What is claimed is:

1. A converter for converting a medium voltage AC power into a low voltage DC power, the converter comprising:
- a line interphase transformer comprising:
- at least one core;
- a plurality of coils provided on the at least one core and configured to receive the medium voltage AC power; and
- at least one auxiliary winding provided on the at least one core and inductively coupled to the medium voltage AC power by the core,
- wherein the line interphase transformer is configured to generate a plurality of phase-shifted AC powers from the medium voltage AC power, the converter further comprising:
- a rectifier configured to generate a medium voltage DC power from the plurality of phase-shifted AC powers; and
- a DC/DC converter stage comprising a switching stage and a converter transformer, wherein the DC/DC converter stage is configured to generate a low voltage DC power from the medium voltage DC power;
- wherein the converter transformer galvanically insulates the low voltage DC power from the medium voltage AC power; and
- wherein the DC/DC converter stage is powered by the at least one auxiliary winding.

2. The converter according to claim 1, wherein the converter transformer is a medium frequency transformer.

3. The converter according to claim 1, wherein the line interphase transformer is connectable to a medium voltage AC power having n phases, and wherein the plurality of phase-shifted AC powers is connected to the rectifier, the rectifier being a multi-pulse rectifier configured to rectify from 2n to 12n pulses.

4. The converter according to claim 1, wherein the line interphase transformer is connectable to a medium voltage AC power having n phases, wherein the plurality of phase-shifted AC powers each comprise n phases, each phase of the phase-shifted AC powers being shifted by an essentially same phase-shift.

5. The converter according to claim 1, wherein the line interphase transformer is connectable to a medium voltage AC power having 3 phases, and wherein the plurality of phase-shifted AC powers is connected to the rectifier, the rectifier being a multi-pulse rectifier configured to rectify 12, 18, 24, or 48 pulses.

6. The converter according to claim 1, wherein at least one of the rectifier and the DC/DC converter stage is connected without galvanic insulation therebetween to an input terminal of the line interphase transformer, the input terminal being configured to receive the medium voltage AC power.

7. The converter according to claim 1, wherein the at least one auxiliary winding is a coil provided on a core of the line interphase transformer.

8. The converter according to claim 1, wherein one of the at least one core is provided for each phase of the medium voltage AC power, and wherein one of the at least one auxiliary winding is provided on the core of the line interphase transformer for each phase.

9. The converter according to claim 1, wherein the at least one auxiliary winding provides a galvanically insulated low voltage AC power configured to power the DC/DC converter stage.

10. The converter according to claim 1, wherein the DC/DC converter stage comprises a plurality of galvanically insulated DC/DC converter stages, and wherein each of the plurality of galvanically insulated DC/DC converter stages is separately powered by one auxiliary winding.

11. The converter according to claim 1, wherein the line interphase transformer comprises a current-divider coil circuit and a balance-coil circuit.

12. The converter according to claim 11, wherein the current-divider coil circuit is provided on a first core, wherein the balance-coil circuit is provided on a second core separate from the first core, and wherein the at least one auxiliary winding is provided on the second core.

13. The converter according to claim 1, wherein the rectifier is an actively switched rectifier, and wherein the actively switched rectifier is powered by the at least one auxiliary winding.

14. The converter according to claim 1, wherein the rectifier is disposed after the plurality of coils, the DC/DC converter stage is disposed after the rectifier, and the auxiliary winding is disposed on the core and separate from the plurality of coils.

15. The converter according to claim 1, wherein the auxiliary winding has less than 20 turns.

16. The converter according to claim 1, wherein the auxiliary winding is galvanically insulated from the medium voltage AC power.

17. A method of converting a medium voltage AC power into a low voltage DC power, the method comprising:
- feeding the medium voltage AC power to a line interphase transformer to generate a plurality of phase-shifted AC powers;
- rectifying the plurality of phase-shifted AC powers with a rectifier to generate a medium voltage DC power;
- converting the medium voltage DC power into a low voltage DC power in a DC/DC converter stage, wherein the low voltage DC power is galvanically insulated from the medium voltage AC power; and
- powering the DC/DC converter stage with power provided by at least one auxiliary winding, wherein the at least one auxiliary winding is comprised in the line interphase transformer and inductively coupled to the medium voltage AC power through a core of the line interphase transformer.

18. The method according to claim 17, wherein powering the DC/DC converter stage comprises converting the power provided by the at least one auxiliary winding into a DC power.

19. A method of operating a converter comprising:
- providing a line interphase transformer, the line interphase transformer including:
  - at least one core;
  - a plurality of coils provided on the at least one core and configured to receive a medium voltage AC power; and
  - at least one auxiliary winding provided on the at least one core and inductively coupled to the medium voltage AC power by the core, the method further comprising:
- generating a plurality of phase-shifted AC powers from the medium voltage AC power;
- rectifying the plurality of phase-shifted AC powers to generate a medium voltage DC power from the plurality of phase-shifted AC powers;
- switching and transforming the medium voltage DC power to generate a low voltage DC power from the medium voltage DC power;
- galvanically insulating the low voltage DC power from the medium voltage AC power by a converter transformer; and
- powering a DC/DC converter stage including the converter transformer by the at least one auxiliary winding.

* * * * *